United States Patent Office 3,598,569
Patented Aug. 10, 1971

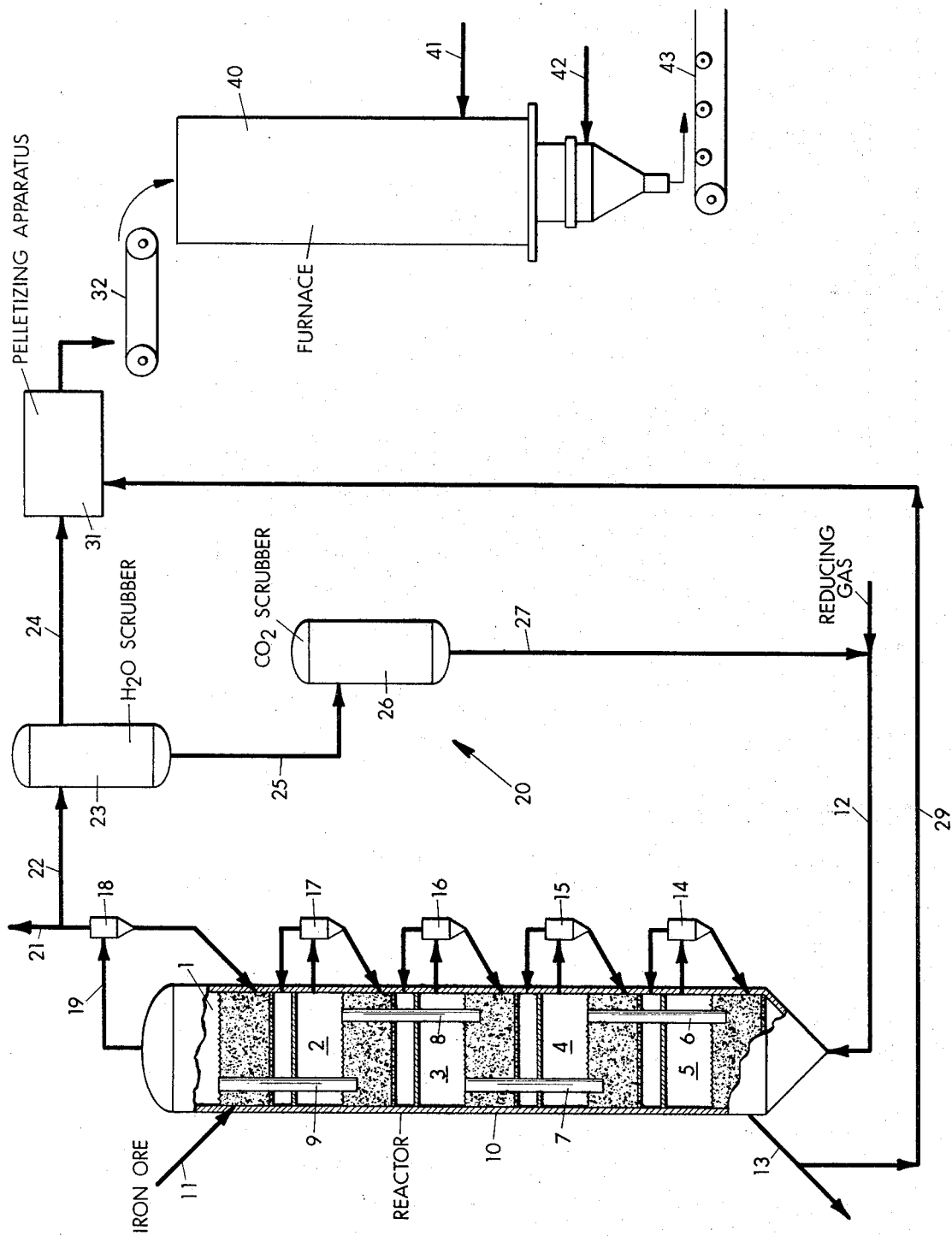

3,598,569
PELLETIZING OF IRON ORE
William R. Epperly, Berkeley Heights, N.J., assignor to Esso Research and Engineering Company
Filed Sept. 12, 1967, Ser. No. 667,111
Int. Cl. C21b *1/20*
U.S. Cl. 75—3
8 Claims

ABSTRACT OF THE DISCLOSURE

Indurated iron oxide pellets are made by an improved process comprising oxidizing green pellets formed from finely divided iron oxide solids and finely divided reduced iron solids. The amount of iron oxide and reduced iron is proportioned so that oxidation of the green pellets will generate sufficient heat to sustain the oxidation and induration process.

---

This invention relates to the art of forming iron ore pellets suitable for use in melting operations. In particular, it relates to an improved pelletizing method comprising admixing and agitating, in the presence of moisture, finely divided iron oxide solids with finely divided reduced iron solids, the solids being related one type to the other as regards temperature and proportions so as to form self-indurating "green" pellets. By forming a downwardly moving bed of the green pellets, and countercurrently contacting the bed with an oxidizing gas, an exothermic reaction can be produced to oxidize and indurate the pellets.

In recent years, considerable attention has been given to the treatment of finely divided iron ores. This is primarily due to the increasing demand for iron and steel, diminishing iron ore reserves, and the availability of such finely divided ores, which are generally unsuitable for use in conventional iron reduction processes. Aside from natural deposits, various iron ore processes now in use expel or produce ores which are too finely divided for direct processing. These are often waste materials, e.g., precipitator dust, flue dust, ashes or by-products of beneficiation techniques involving washing, screening, jigging, flotation, magnetic concentration, and the like.

Furnaces, e.g., the conventional blast furnace, are the primary tools for converting ores to iron. These, however, are subject to serious limitations inasmuch as they cannot process fines. The iron ore feed to such furnaces must be of fairly large particle size. Undersized particles simply cannot be reduced and will be blown from the furnaces.

Quite recently, fluidized iron ore reduction processes have been given considerable attention. While these processes utilize finely divided iron ores as feeds, they too are unsuitable for handling ultra-fine particle sizes. There is much waste inasmuch as the very fine particles, i.e., those ranging below about 44 microns (325 mesh, Taylor series), and especially those ranging below about 10 microns, cannot be processed. Typically, upon charging ore into such processes, the ultra-finely divided particles are blown out with the exhaust gas, this representing waste. Moreover, where substantial quantities of the ultra-fine particles are present, it is extremely difficult to reduce the ore and maintain proper fluidization.

In view thereof, it is conventional to collect iron ore fines from natural sources or from various waste streams for agglomeration and recycle or direct use as, e.g., blast furnace feed. Sintering or pelletizing operations are considered essential, and agglomeration by pelletizing is widely used for the conversion of fine-sized materials and minerals to usable products.

In agglomerating or pelletizing, fine iron-bearing materials are formed into nodules or lumps by use of, e.g., balling drums, disc pelletizers, cone pelletizers, and the like. The individual particles must then be partially fused together, as by sintering, nodulizing as in a rotary kiln, or balling and pelletizing in a shaft furnace or travelling grate to provide the necessary mechanical strength.

In the preliminary mixing of the finely divided iron-bearing materials, binders are generally used to raise the wet strength of the green pellets to acceptable levels for subsequent handling. Particulate solid fuels are sometimes incorporated within the mixture, or applied as a coating on the outside of the finished pellets. In any regard, the initially formed green pellets are subjected to induration by heating the preformed particles to incipient fusion temperatures. In a time-honored process, the green pellets are charged downwardly through a shaft furnace, dried, and then heated to induration temperatures at about a quarter of the way down the shaft. Toward the bottom of the furnace, prior to discharge, the pellets are cooled by an updraft of air.

There are several disadvantages associated with the use of the furnace. In the first place, there is extreme difficulty in maintaining uniform combustion and hot spots cause the pellets to fuse together into oversized masses or lumps. Moreover, fuel requirements are considerable, and the furnace has proven unsatisfactory for processing hematite fines. The latter difficulty is due largely because of hanging and sticking required by the high heat inputs necessitated in case hardening hematite pellets.

The primary object of the present invention is to obviate the foregoing and other difficulties. In particular, it is an object to provide a new and improved process combination for forming self-indurating green pellets. More particularly, it is an object to provide a process combination for forming such pellets, and steps for their subsequent self-induration without use of extraneous fuel. Even more particularly, it is an object to provide, as an article of manufacture, self-indurating pellets which can be processed by contact with an oxidizing gas to uniformly provide heat for the induration of the pellets. A further object is to provide pellets of various particle size distributions suitable as "micro pellets" for recycle to fluid iron ore reduction processes, and larger pellets suitable as furnace feeds.

These and other objects are achieved in accordance with the present process comprising forming green self-indurating pellets by admixing together, in the presence of moisture, finely divided iron oxide solids with finely divided reduced iron solids in sufficient proportion that oxidation will provide the heat necessary for sintering in a subsequent induration step. The invention contemplates the use of iron oxide solid fines consisting essentially of hematite, magnetite, or mixtures of these and other solids. Even when employing essentially magnetite fines, the normal fuel requirements for sintering are significant and can be reduced by the present invention.

In the formation of the green pellets from hematite, preferably from about 50 percent to about 85 percent, and more preferably from about 70 percent to about 85 percent, of the hematite fines, based on the weight of the total mixture (dry basis), is admixed with the reduced iron solids. When using magnetite, preferably from about 75 percent to about 90 percent of the magnetite fines is admixed with from about 25 percent to about 10 percent of the reduced iron product, based on the weight of the total solids (dry basis). The reduced iron product employed is one ranging from about 50 percent to about 99 percent, and preferably from about 75 percent to about 95 percent metallization, the latter being defined as the weight of metallic iron present in admixture with ferrous oxide, FeO.

Such mixtures can be conveniently pelletized in conventional apparatus, e.g., balling drums, discs, cone pelletizers, and the like. The presence of water is essential.

Suitably, moisture is added to the finely divided solids prior to subjection to the rolling action of the pelletizing apparatus to adjust the total moisture content to from about 6 percent to about 15 percent, and preferably from about 8 percent to about 12 percent, based on the weight of the total mixture. Binders can also be added to raise the wet strength of the resultant green pellets to higher levels for subsequent handling, and to improve the ballability of the product.

After formation of the green pellets, these can be then indurated at temperatures ranging from about 2200° F. to about 2650° F., and preferably from about 2300° F. to about 2500° F. by contact with a suitable oxidizing gas. Pursuant to the invention, the fuel requirement is supplied by the reduced iron which is oxidized by the gas to provide an exothermic reaction. The amount of iron present relative to the total oxides is balanced to provide the optimum induration temperature. For maximum heat liberation, the ratio of metallic iron to iron oxides is high, and the metallic iron is oxidized essentially to ferric oxide.

A feature of this invention is that the gas phase temperature can be maintained essentially the same as the desired induration temperature. This maintains uniform heat distribution and eliminates many problems because the heat of induration is generated by the oxidation of the iron in the individual green pellets. In contrast, in a conventional process the heat of induration is supplied by a hot gas stream, the temperature of which must necessarily be above the desired induration temperature. As a result, the gas phase temperature is conventionally dangerously close to the melting point of the pellets, and bogging and bridging between the individual pellets can readily occur.

Unexpected improvements in pellet quality result from this invention. Ore fines containing the optimum quantities of reduced iron can be indurated conveniently in a shaft furnace. Pursuant thereto, the green pellets are countercurrently contacted and the pellets uniformly heated with the oxidizing gas. This is sharply contrasted with pelletizing operations in the conventional shaft furnace because heat distribution is extremely poor. It is not uniform when the heat of induration is supplied by contact of the pellets with combustion mixtures. In the present invention gas distribution ceases to be critical. As a result, pellets of superior quality are made. Moreover, the shaft furnace process becomes more economical, and off-specification reduced iron product from direct iron ore reduction processes can be used in conjunction with pelletizing to provide attractive operations.

The present invention will be better understood by reference to the following detailed description and to the attached flow diagram which shows a preferred embodiment of the present invention.

Referring to the figure there is shown a reactor 10 divided into a series of stages 1, 2, 3, 4, 5. Each stage contains a bed of iron oxides, fluidized by ascending reducing gases, injected into the bottom of the reactor via line 12. Iron oxide solids are introduced into the reactor via line 11, the oxides overflowing from one bed to the next via the overflow lines 9, 8, 7, 6. The iron oxides are progressively reduced in each of the several beds, and the final reduced product is withdrawn from stage 5 via line 13.

The reducing gas injected into reactor 10 via line 12 is dispersed through the supporting grids to fluidize the individual beds. To lessen entrainment of solids, gases are withdrawn from the vapor spaces above the beds and dispersed through cyclone separators 17, 16, 15, 14 to plenum chambers located below the individual grids. Solids collected from the individual cyclones are returned to the stage from which the reducing gases were taken. The spent gases removed from stage 1 is passed via line 19 into cyclone separator 18. Some of the solids are returned to the bed, but large proportions of the ultra-finely divided iron oxides solids are rejected by the process and entrained in the off-gas from the reactor. Some of the ultra finely divided iron oxides, e.g., hematite or magnetite, remain unreduced, and very little of the oxides, if any, is reduced to a lower oxidation stage than magnetite. The gases are passed to a gas regenerator system 20. A portion of the gas can be vented via line 21, as desired.

The spent gases are passed via line 22 into a water scrubber 23 wherein finely divided or particulate reject solids are removed and sent via line 24 to a settling pond (not shown) where the iron oxides' fines are concentrated to about 50 percent, by weight, solids. The fines are further concentrated by filtering or centrifugation, or both, and then transported to a pelletizing apparatus, e.g., a balling drum 31. Within the scrubber 23 the gases are dehumidified and passed via line 25 to a carbon dioxide scrubber 26. Therein, the gases are contacted with a basic scrubbing agent, e.g., monoethanolamine, and the acidic components of the gas, e.g., carbon dioxide, removed. The regenerated gases are passed via line 27 to line 12 wherein they are combined with fresh reducing gas from a source not shown, reheated, and injected into the bottom of reactor 10 via line 12.

Particulate reduced iron product is withdrawn from the final ferrous reduction stage via line 13, and a portion thereof is transferred via line 29 to the pelletizing apparatus 31. Within the pelletizing apparatus 31 the byproduct iron oxides' fines, generally consisting of a mixture of ferric oxide and magnetite, are admixed with the reduced iron product. If desired, additional iron oxide fines from an extraneous source can be added to make up the desired portions, and water can be injected to assure adequate moisture. A binder, e.g., bentonite, is generally added to the mixture to promote the formation of green pellets.

Preferably a proportion of the iron oxide fines is magnetite because this lowers the amount of reduced iron which must be added. The green pellets can be prepared in various particle size distributions ranging, e.g., from $\frac{1}{32}$ inch to about 1 inch. Generally, however, pellets are prepared in sizes ranging from about $\frac{3}{8}$ inch to about $\frac{5}{8}$ inch for use in a blast furnace. For recycle to a direct iron ore reduction process, the particle sizes should range from about $\frac{1}{32}$ inch to about $\frac{1}{4}$ inch. The smaller sized pellets in this range are preferably used for LD and Kaldo converters, although the relatively larger pellets can also be used.

From the pelletizing apparatus 31, the green pellets are preferably conveyed to a shaft furnace for induration. Thus, green pellets from pelletizing apparatus 31 are conveyed as via a moving belt or grate 32 to shaft furnace 40. The green pellets are discharged from the moving belt 32 into the top of the shaft furnace 40 and countercurrently contacted by an ascending oxidizing gas injected into the bottom of the furnace 40 via line 42. It should be noted that for startup purposes a means (not shown) of heating the inlet air to from about 1000° F. to about 1500° F. is provided. When the oxidation of the reduced iron is initiated, this heating means can be removed or inactivated. On the other hand, air-enriched oxygen could be used but there is no particular need for such means.

Upon contact with the oxidizing gases, the metallic iron portions of the pellets begin to oxidize and liberate heat. Toward the bottom of the shaft furnace 40 an updraft of air injected via line 42 cools the pellets to some extent, and the particles are discharged at temperatures ranging from about 800° F. to about 1100° F. below the induration temperature. The product is drawn through a chunk breaker and discharged from the bottom of the shaft furnace 40 via an appropriate conveying means 43. It can be cooled to 100° F. on a high temperature conveyer.

EXAMPLE

By way of example, 18.3 weight percent particulate reduced iron product, of 99 percent metallization, from a staged fluidized iron ore reduction process is admixed with 10 weight percent water and 71.7 weight percent byproduct hematite ranging about 325 mesh, and finer, and pelletized. The pellets are fed into a shaft furnace having an overall thermal efficiency of 90 percent.

Forty pounds of air containing 21 mole percent oxygen, per 100 pounds of green pellets, is fed into the shaft furnace. The temperature of the furnace rises to 2400° F. and induration occurs. The indurated pellets are withdrawn from the furnace and cooled.

In contrast, when the foregoing is repeated by balling to form pellets of 90 weight percent hematite and 10 weight percent water, the amount of air required to produce induration at 2400° F. is about 90 pounds per 100 pounds of green pellets.

It is apparent that various changes and modifications can be made without departing the scope and spirit of the invention.

Having described the invention, what is claimed is:

1. A process for making indurated iron oxide pellets comprising;
    mixing and agitating, in the presence of water, finely divided iron oxide solids and finely divided reduced iron solids thereby forming green pellets, said reduced iron solids being greater than about 50% metallized and present in an amount relative to said iron oxide solids so that oxidation of said reduced iron solids produces the exothermic reaction sufficient to provide an induration temperature above about 2200° F., and contacting said green pellets with an oxidizing gas at a temperature sufficient to initiate the exothermic reaction which oxidizes and indurates said green pellets at a temperature above about 2200° F.

2. The process of claim 1 wherein from about 50 percent to about 85 percent of the iron oxide solids, based on the weight of iron oxide and reduced iron solids, are hematite.

3. The process of claim 1 wherein from about 70 percent to about 85 percent of the iron oxide and reduced iron solids are hematite.

4. The process of claim 1 wherein the iron oxide solids consist essentially of hematite having a major proportion of particles distributed in sizes below about 44 microns.

5. The process of claim 1 wherein from about 85 percent to about 90 percent of the iron oxide and reduced iron solids is magnetite.

6. The process of claim 1 wherein from about 6 percent to about 15 percent, based on the weight of the total mixture, is water.

7. The process of claim 1 wherein said green pellets are formed by admixing a particulate reduced iron ore product with reject iron oxide solids too finely divided for processing in a fluidized iron ore reduction process.

8. The process of claim 1 including forming a downwardly moving bed with said green pellets while contacting the bed countercurrently with said oxidizing gas.

References Cited

UNITED STATES PATENTS

| | | | |
|---|---|---|---|
| 1,536,032 | 4/1925 | Stillman | 75—3 |
| 2,676,095 | 4/1954 | De Vaney et al. | 75—3 |
| 2,805,141 | 9/1957 | Apuli | 75—3 |
| 3,125,437 | 3/1964 | Moore et al. | 75—3 |
| 1,792,413 | 2/1931 | Christiansen | 75—5 |
| 1,951,935 | 3/1934 | Johannsen | 75—5 |
| 2,793,109 | 5/1957 | Huebler et al. | 75—3 |
| 2,807,536 | 9/1957 | O'Malley | 75—26X |
| 2,826,487 | 3/1958 | Davis, Jr. | 75—5 |
| 2,960,396 | 11/1960 | De Vaney | 75—3 |
| 3,097,945 | 7/1963 | Paris et al. | 75—5X |
| 3,365,339 | 1/1968 | Beggs et al. | 75—3 |
| 3,428,445 | 2/1969 | Rausch et al. | 75—3 |
| 3,469,970 | 9/1969 | Heitmann | 75—5X |

FOREIGN PATENTS

| | | | |
|---|---|---|---|
| 828,412 | 2/1960 | Great Britain | 75—3 |
| 621,661 | 4/1949 | Great Britain | 75—3 |

OTHER REFERENCES

McGannon (ed.), "The Making, Shaping, and Treating of Steel," United States Steel, Eighth Ed., 1965, pp. v, 192–197, 208 and 209.

ALLEN B. CURTIS, Primary Examiner